(12) United States Patent
Benz (10) Patent No.: US 10,883,375 B2
(45) Date of Patent: Jan. 5, 2021

(54) TURBOENGINE, AND VANE CARRIER UNIT FOR TURBOENGINE

(71) Applicant: ANSALDO ENERGIA SWITZERLAND AG, Baden (CH)

(72) Inventor: Urs Benz, Gipf-Oberfrick (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 381 days.

(21) Appl. No.: 15/483,539

(22) Filed: Apr. 10, 2017

(65) Prior Publication Data

US 2017/0292392 A1 Oct. 12, 2017

(30) Foreign Application Priority Data

Apr. 8, 2016 (EP) .................................... 16164575

(51) Int. Cl.
*F01D 9/04* (2006.01)
*F01D 9/02* (2006.01)
(Continued)

(52) U.S. Cl.
CPC .............. *F01D 9/042* (2013.01); *F01D 5/02* (2013.01); *F01D 9/023* (2013.01); *F01D 9/041* (2013.01); *F02C 3/14* (2013.01); *F23R 3/002* (2013.01); *F23R 3/60* (2013.01); *F01D 25/28* (2013.01); *F02C 7/20* (2013.01); *F05D 2220/32* (2013.01); *F05D 2220/3212* (2013.01); *F05D 2240/35* (2013.01); *F05D 2260/30* (2013.01); *F23R 2900/00012* (2013.01);
(Continued)

(58) Field of Classification Search
CPC ......... F05D 2240/12; F05D 2220/3212; F01D 9/042; F01D 25/246; F23R 2900/00017; F02C 7/20
See application file for complete search history.

(56) References Cited

U.S. PATENT DOCUMENTS 8,402,769 B2 * 3/2013 Maltson .................... F23R 3/60
60/796
2006/0032237 A1 2/2006 Aumont et al.
(Continued)

FOREIGN PATENT DOCUMENTS

EP 1744014 A1 * 1/2007 ............. F01D 9/023

OTHER PUBLICATIONS

European Search Report dated Sep. 13, 2016 in European Application No. 16164575.9.

*Primary Examiner* — Alain Chau
(74) *Attorney, Agent, or Firm* — Buchanan Ingersoll & Rooney PC (57) ABSTRACT

A turboengine as disclosed includes an outer wall structure and an inner wall structure, wherein the inner wall structure is provided at a radially inner position with respect to the outer wall structure, and each of the wall structures has a surface, the surfaces being arranged facing each other in the radial direction. At least one guide vane member includes at least one airfoil, a radially inner end and a radially outer end. The inner wall structure and the outer wall structure are jointly provided as a vane carrier unit, wherein the inner wall structure and the outer wall structure are fixedly connected to each other by at least one bridging member extending between the inner wall structure and the outer wall structure.

13 Claims, 5 Drawing Sheets

(51) Int. Cl.
*F23R 3/60* (2006.01)
*F01D 5/02* (2006.01)
*F23R 3/00* (2006.01)
*F02C 3/14* (2006.01)
*F02C 7/20* (2006.01)
*F01D 25/28* (2006.01)

(52) U.S. Cl.
CPC ..... *F23R 2900/00017* (2013.01); *Y02E 20/16* (2013.01); *Y02T 50/60* (2013.01)

(56) References Cited

U.S. PATENT DOCUMENTS

| | | |
|---|---|---|
| 2007/0028620 A1 | 2/2007 | McMasters et al. |
| 2008/0008584 A1 | 1/2008 | Shteyman et al. |
| 2010/0031673 A1* | 2/2010 | Maltson ............... F23R 3/60 60/796 |
| 2013/0318991 A1* | 12/2013 | DiCintio ............... F23R 3/34 60/774 |
| 2015/0059348 A1* | 3/2015 | Toronto ............... F02C 7/228 60/772 |
| 2016/0061449 A1 | 3/2016 | Pankey |
| 2016/0201472 A1* | 7/2016 | Okajima ............... F01D 9/02 415/177 |

\* cited by examiner

TURBOENGINE, AND VANE CARRIER UNIT FOR TURBOENGINE

PRIORITY CLAIM

This application claims priority from European Patent Application No. 16164575.9 filed on Apr. 8, 2016, the disclosure of which is incorporated by reference.

TECHNICAL FIELD

The present disclosure relates to a turboengine. It further relates to a guide vane carrier unit for a turboengine.

BACKGROUND OF THE DISCLOSURE

The stationary first or inlet guide vanes of an expansion turbine of a turboengine, and in particular of a gas turbine engine, are typically supported at an outer end and an inner, or hub side, end, in order to support the axial forces resulting from the absolute pressure differential over the inlet guide vane at the high temperatures typically being present. The vanes are generally provided as vane members, wherein a vane member comprises one or more airfoils, which extend between two platforms. An inner or hub side platform of the vane member constitutes the inner or hub side end of a vane member, and an outer platform constitutes an outer end, wherein the outer end is, with respect to an axis of the turboengine, located on a larger radius than the inner or hub side end. The airfoils extend in the radial direction and across a duct. For instance in a gas turbine engine, an annularly extending row of first or inlet guide vanes of an expansion turbine are interposed between a combustor and a first row of expansion turbine running blades. More generally spoken, the first or inlet guide vanes are disposed at a working fluid inlet of the expansion turbine, and upstream a first row of expansion turbine running blades.

The radially outer end of a first row guide vane member is typically supported by a turbine housing. For aerodynamic reasons, the hub side support may not be provided straight and radially from the housing, but may be provided by the rotor cover which in turn extends an axial distance along the rotor from its own support. It is a well-known fact that, upon a change of the temperature of a working fluid of a turboengine entering the expansion turbine, the rotor cover and the turbine housing respond to the temperature change of the fluid with different time constants. Commonly, the rotor cover follows the working fluid temperature change significantly faster than the turbine housing. This is not an issue if the turboengine operates with a by and large constant temperature of the fluid entering the expansion turbine. In these cases the rotor cover and the housing will be at essentially constant and largely equal temperatures. Thus, both members will experience an essentially equal thermal expansion. Steady state thermal expansion of the housing and the rotor cover may thus be easily accounted for. However, in case of significant load changes of the turboengine, which go hand in hand with changes of the temperature of the fluid entering the expansion turbine, differential thermal expansion of the housing and the rotor cover need to be considered. This becomes most accentuated upon a fast loading of the engine form idle or even standstill to a high engine load. Due to a differential thermal expansion of the rotor cover and the housing of the turboengine, the hub side of the turbine inlet guide vane is axially displaced with respect to the radially outer side. The vane members tilt, and hub side axial gaps open or close, radial steps or ledges are formed, and the gaps may need to be dimensioned larger than required for steady state operation, potentially causing enhanced fluid leakages and related performance degradation at steady state operation. Said axial gaps on the hub side are typically found between the hub side ends of the vane members and a duct provided upstream of the guide vane, for supplying working fluid to the guide vane, and between the hub side end of the guide vane and a rotor. The latter gap, as an interface between static and rotating turbine parts, is a factual matter, and working fluid leakages in this gap may only be mitigated by a suitable arrangement of sealings and an appropriate provision of sealing flows. Due to the tilting of the vane members, at least at one of the interfaces between the vane members and the supporting structures, which is provided as a radially floating support arrangement, not only axial displacement occurs, but also radial displacement. The combination of radial and axial displacement aggravates sealing of the interface. Widening of gaps during operation states without thermal matching of the housing and the rotor cover may cause additional performance penalties during these phases of operation. It may take several hours until thermal steady state and thermal matching is achieved. In today's grid operation, turboengine power plants, and in particular gas turbine and combined cycle power plants, are increasingly used as peak load engines, with frequent significant and fast load changes. The operation times in which no thermal equilibrium of the engine components is achieved, and accordingly significant dimensional mismatch due to differential thermal expansion is present, may thus cumulate to a significant share of the overall operation time, and cumulative performance losses become increasingly relevant for the power plant operator.

LINEOUT OF THE SUBJECT MATTER OF THE PRESENT DISCLOSURE

It is an object of the present disclosure to provide a turboengine and a vane carrier unit. The vane carrier unit may in particular be an inlet guide vane carrier unit. In a more specific aspect, the turboengine and the vane carrier unit shall be provided to mitigate the problems related to the art. Still more specifically, issues related to differential displacement on the inner end of the guide vane members and the outer end of the guide vane members, or the support points thereof, respectively, shall be mitigated. In an even more specific aspect, increased leakages and other factors causing performance losses upon non-stationary operation of the turboengine shall be mitigated.

Further effects and advantages of the disclosed subject matter, whether explicitly mentioned or not, will become apparent in view of the disclosure provided below.

Accordingly, disclosed is a turboengine, the turboengine defining a radial direction, an axial direction, a circumferential direction, and a main working fluid flow direction extending in the axial direction. The turboengine comprises an outer wall structure and an inner wall structure, wherein the inner wall structure is provided at a radially inner position with respect to the outer wall structure, and each of the wall structures comprises a surface, said surfaces being arranged facing each other in the radial direction. A duct is provided between the inner wall structure and the outer wall structure and has a downstream end with respect to the main working fluid flow direction. At least one guide vane member is arranged at the downstream end of the duct, the guide vane member comprising at least one airfoil, a radially inner end and a radially outer end. It is understood, that upstream and downstream refer to a main working fluid flow direction of the turboengine. It is in this respect understood that in a turboengine, or a section thereof, respectively, a main working fluid flow direction is for instance uniquely defined by a direction in which the flow cross section of an expansion turbine widens. In another aspect, the main flow direction may be defined from a working fluid inlet to a working fluid outlet. In particular, the main working fluid flow direction is, in particular in axial flow turboengines, at least essentially aligned with an axis direction, in particular the axis direction of a shaft, of the turboengine. In certain embodiments, the guide vanes may be guide vanes of an axial flow turboengine stage. The radially inner end of a guide vane member may be provided by an inner or hub side platform, and the radially outer end may be provided by an outer platform, wherein at least one airfoil extends between said two platforms. It will be appreciated, that radially inner and radially outer are referred to the radial direction of the turboengine, wherein an axis of a turboengine shaft provides the center. The inner end of the guide vane member is supported at the inner wall structure, and the outer end of the guide vane member is supported at the outer wall structure. The inner wall structure and the outer wall structure are jointly provided as a vane carrier unit, wherein the inner wall structure and the outer wall structure are fixedly connected to each other by at least one bridging member extending between the inner wall structure and the outer wall structure, and wherein the bridging member is provided upstream the downstream end of the duct with respect to the main working fluid flow direction. It is understood that the connection provided by the bridging member, being provided as a fixed connection, does not provide for any floating or displacement capability, at least neither axially nor radially, of the two wall structures at the bridging connection.

It is appreciated that the duct is a duct through which working fluid for being expanded in an expansion turbine may be provided to the guide vane member. It is understood that the guide vane member is a guide vane member of the expansion turbine. In that the wall structures are jointly provided as a vane carrier unit, and the guide vane member is supported by the wall structures, it is appreciated that the guide vane member is actually provided integrally with the duct. Thus, the sealing between the static parts is largely facilitated, as residual gaps and relative displacement between the wall structures and the guide vane member may be largely reduced, if not be completely avoided.

Disclosed is a vane carrier unit comprising a first wall structure and a second wall structure, wherein each of the wall structures comprises a surface, said surfaces being arranged facing each other, a free space being provided between the mutually facing surfaces. A first vane support feature is provided on the first wall structure, and a second vane support feature is provided on the second wall structure and opposite the first vane support feature. The vane support features are provided at an end of the free space. A bridging member is provided connecting the first and the second wall structure and is provided distant from said end of the free space. In particular, said end of the free space defines a downstream end of the free space, and the bridging member is provided upstream the downstream end of the free space. By virtue of this definition, also an upstream and downstream direction, and upstream and downstream ends, are defined for the vane carrier unit and the wall structures thereof.

Further disclosed is a guide vane unit, comprising a vane carrier unit and at least one guide vane member being attached to the vane carrier unit. In particular, the guide vane unit is disposed outside the duct, or at a downstream end thereof, respectively, and proximate the downstream end of the duct.

In instances of the turboengine, the guide vane member may be attached to and supported by the inner and the outer wall structures by a radially as well as axially fixed support assembly provided at one of the inner and outer wall structures, and by an axially fixed and radially floating support assembly at the other one of the inner and outer wall structures. In particular embodiments, the axially and radially fixed support assembly is provided at the radially outer wall structure, and the axially fixed and radially floating support assembly is provided at the radially inner wall structure. In instances, the support assemblies are provided at an upstream end of the guide vane member. It is understood that further floating support assemblies may be provided. However, those further support assemblies need to be neither radially nor axially fixed, or, in other words, radially as well as axially floating, in order to enable an unrestricted differential thermal expansion between the guide vane member and the wall structures. Said further support assemblies may be provided as auxiliary support assemblies to facilitate attaching a guide vane member to the vane carrier unit. Further, a sealing arrangement may be provided between the hub side end of the guide vane member and a rotor cover.

Accordingly, a guide vane unit is disclosed in which the guide vane member is attached to and supported by the first and second wall structures by a radially as well as axially fixed support assembly provided at one of the first and second wall structures, and by an axially fixed and radially floating support assembly at the other one of the first and second wall structures. In instances, the support assemblies are provided on a side of the guide vane member which is located proximate to the downstream end of the duct, or at an upstream end of the guide vane member.

Accordingly, in a vane carrier unit the support features are provided to enable a radially as well as axially fixed support of the guide vane member at one of the first and second wall structures and an axially fixed and radially floating support of the guide vane member at the other one of the first and second wall structures.

The radially and axially fixed support assembly may for an instance be provided in that the respective wall structure comprises a circumferentially and radially extending slot, with an axially extending undercut being provided. The guide vane member comprises a male support element extending from one of the radially inner and outer ends, or more generally spoken, ends provided in a spanwidth direction of the at least one airfoil. It is understood that said ends may be provided by platforms of the guide vane member. The male support element is provided in an axially snug fit with the slot. An axially salient element is provided on the male support element distant from the end of the guide vane member, and is provided in engagement and a radially snug fit with the undercut of the slot. The axially fixed and radially floating support assembly may for an instance be provided in that the respective wall structure comprises a circumferentially and radially extending slot.

The guide vane member comprises a male support element extending from the other one of the radially inner and outer ends, or more generally spoken, ends provided in a spanwidth direction of the at least one airfoil. It is understood that said ends may be provided by platforms of the guide vane member. The male support element is provided in an axially snug fit with the slot, while no radial engagement is provided.

With respect to a vane carrier unit or a guide vane unit, it is understood, when considering the intended use in a turboengine, that radial and circumferentially extending equivalently denotes extending at least essentially parallel to a cross section of the downstream end of the duct.

It is understood that generally an annular guide vane row is provided in a turboengine. In some applications, the preassembled annular row of vanes may be installed in an engine, and accordingly one single vane carrier unit may be provided which extends around the full engine circumference. This is for instance, while not being limited to, the case in some types of aeroengines. However, in other embodiments at least two vane carrier units may be provided along the circumferential direction of the turboengine to form an annular guide vane row. In particular heavy duty turboengines are frequently provided with a housing which is split in an axially extending plane, and more particularly in a midplane. Generally, when the turboengine is provided on a foundation, a horizontal split of the housing is commonly provided. In this case, the turboengine may comprise for instance, while not being limited to, two semi-annular vane carrier units to jointly form an annular structure.

In more specific exemplary embodiments, the bridging member is provided upstream the duct which is formed between the wall structures. Accordingly, in a vane carrier unit or a guide vane unit, the bridging member is arranged outside the free space and on an opposite side than the vane support arrangements.

A multitude of bridging members may provided along the circumferential direction, or, across a duct flow cross section. It is understood in this respect that the duct flow cross section is defined as being provided parallel to a cross section of the above-defined downstream end of the duct, or, in a radially extending plane. At least two bridging members are in this instance provided at a circumferential distance from each other, or distant from each other across the duct flow cross section.

The bridging member may be one of curved or angled, and cantilever from one of the wall structures, in particular the outer wall structure, in a first section in the upstream direction and extends in a second section to the other wall structure, and in particular extends radially inwardly to the inner wall structure. Further in particular, the bridging member is attached to the wall structure from which it extends at an upstream end of said wall structure.

One of the wall structures, and in particular the inner wall structure, may comprise an extension extending upstream of the duct.

One of the wall structures, and in particular the inner wall structure, and the bridging member may attached to each other by a flange connection.

In a turboengine, the guide vane member may in certain aspects be an inlet guide vane member of an expansion turbine and be provided upstream a first row of running blades of the expansion turbine. The outer wall structure in this instance extends from an expansion turbine vane carrier. The outer wall structure may be attached, for instance via a flange connection, to the turbine vane carrier, or may be shaped integrally therewith, in one piece, such that the outer wall structure is an extension of the turbine vane carrier. The duct is in fluid communication with the expansion turbine, with the inlet guide vane member being interposed between the duct and the first row of running blades of the expansion turbine. It is understood that in this instance the guide vane member is a member of a first stage guide vane row of an expansion turbine.

Further, the duct may be provided with an annular downstream discharge face, the annular discharge face circumferentially extending around an axis of the turboengine and being in fluid communication with a circumferentially disposed row of guide vane members. It is understood that this embodiment is particularly well suited to provide a circumferentially largely uniform inflow condition for an expansion turbine stage.

According to certain aspects, the duct in a turboengine may be a duct with an at least annular cross section, or a duct of a toroidal shape, respectively. The duct in a vane carrier unit or in a guide vane unit may have at least essentially the shape of a sector of a toroid. At least essentially means that at least one of the boundaries may have a polygonal shape, with at least 16 corners or more, thus fairly approximating a toroidal shape. The toroidal shape may be formed between two at least essentially cylindrical boundaries, an at least essentially cylindrical and an at least essentially frustoconical boundary, or between two at least essentially frustoconical boundaries. The "at least" again denotes that the cross sections of the boundaries may be approximated by a polygonal shape. In certain aspects, the duct may taper in the working fluid main flow direction. In further aspects, the duct may in its entirety be inclined radially inwardly in the working fluid main flow direction. These statements apply mutadis mutandis for a vane carrier unit or a guide vane unit, respectively.

The duct may in certain instances be provided in fluid communication with an upstream duct extension which in turn is closed at an upstream end, with at least one inflow opening being provided. Multiple inflow openings may be provided circumferentially distributed, or across the duct flow cross section. The bridging members may in these instances be provided circumferentially between the inflow openings.

In further aspects, the turboengine is a gas turbine engine.

In certain instances of the gas turbine engine, a multitude of can combustors are circumferentially disposed around an axis of the turboengine and upstream of the duct, wherein each can combustor is in fluid communication with a duct at an upstream end of the duct. In more particular embodiments, a multitude of can combustors is in fluid communication with a single duct, and more particularly all can combustors are provided in fluid communication with a single annular duct. The interface between the can combustors and the duct, or the ducts, respectively, is in certain more specific embodiments provided as a floating, and more particularly axially floating, interface. This enables the said interface, or interfaces, respectively, to accommodate axial displacement due to differential thermal expansion of engine components. At this interface, a sealing may be considerably easier to achieve, for instance in applying sealing members known from the art, than at the interface from the duct to the guide vane members.

In further instances, the duct itself is provided as a combustor, wherein combustor liners are provided on the mutually facing arranged surfaces of the wall structures. That is, in other words, the liners are provided on the vane carrier. The combustor liners may be provided by a multitude of liner segments, which may be plan plates or tiles. When providing the liner segments as plan tiles of plates, for instance, the above-mentioned polygionial cross section boundaries of the duct result. It is understood that appropriate means for discharging and/or admixing a fuel into the main working fluid flow are in this instance provided in, at, or upstream of the duct.

In this respect, the duct may in more specific instances be a downstream combustor of a sequential combustion system. For one instance, the duct may receive oxygen rich flue gas from upstream disposed can combustors, which is admixed with fuel, and said fuel is combusted in the duct. Such combustion systems and the means for injecting and/or admixing fuel are familiar to the skilled person.

In this respect, a vane carrier unit, comprising a vane carrier as set forth above and a guide vane member may be considered a combustor, or combustor segment, respectively, with an integrated guide vane. Combustor liner segments may in this instance be provide on the wall structures.

As mentioned above, the outer wall structure may extend from an expansion turbine vane carrier, and may be shaped integrally therewith, in one piece, or may be attached thereto, such that the vane carrier is a separate unit which is detachably fixed to the expansion turbine vane carrier. It is understood that the vane carrier unit, or the outer wall structure, respectively, may be attached to the expansion turbine vane carrier in a radially and axially fixed manner. In providing the vane carrier unit, or the guide vane unit, respectively, separately from the turbine vane carrier, the individual members of the vane carrier unit and the guide vane unit may be cast and machined as individual, easier to handle components. The vane carrier unit or guide vane unit may be pre-assembled, and the assembly may then be attached to the expansion turbine vane carrier. Access to engine components may be considerably facilitated if the vane carrier unit or guide vane unit may be detached from the turbine vane carrier. Further, the interface between the vane carrier unit and the expansion turbine vane carrier may be provided with a thermal insulation. It may thus be possible, to cool the expansion turbine vane carrier, for instance in a gas turbine engine with cooled compressor discharge fluid. Said measure is suitable to reduce radial tolerances between static and rotating parts of the expansion turbine, for instance a radial play or radial tolerance between the first rotating row of expansion turbine blades and a static heat shield, and thus serves to enhance the turbine efficiency.

It is understood that all statements made above with respect to a turboengine apply mutadis mutandis for a vane carrier unit or a guide vane unit, respectively.

It is understood that the features and embodiments disclosed above may be combined with each other. It will further be appreciated that further embodiments are conceivable within the scope of the present disclosure and the claimed subject matter which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show FIG. 1 a first view of a part of a gas turbine engine, illustrating the arrangement of a vane carrier unit of the type initially mentioned, a can combustor, a rotor cover, and a first row of running blades of an expansion turbine in a view from a first circumferential position.

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

EXEMPLARY MODES OF CARRYING OUT THE TEACHING OF THE PRESENT DISCLOSURE

Figure 1:
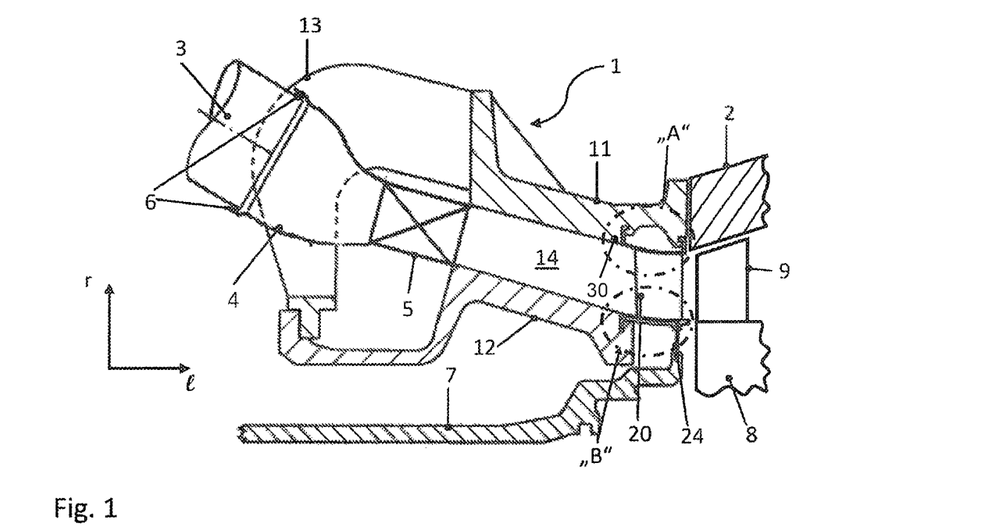
Figure 2:
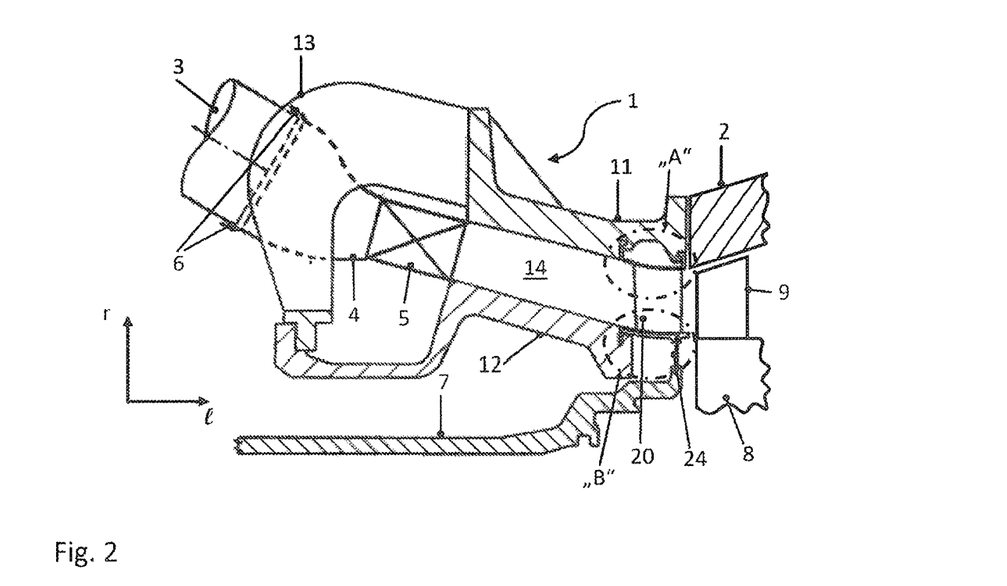
FIG. 2 a second view of a part of the gas turbine engine, illustrating the arrangement of a vane carrier unit of the type initially mentioned, a can combustor, a rotor cover, and a first row of running blades of an expansion turbine in a view from a different circumferential position.

FIGS. 1 and 2 depict sections of a part of an exemplary gas turbine engine taken at different circumferential positions. The gas turbine engine defines a radial direction r and an axial direction e. A main working fluid flow direction extends essentially along the axial direction e, and is generally directed from a compressor, not shown in the present depiction, to an expansion turbine. The gas turbine engine comprises a vane carrier unit 1, which in turn comprises an outer wall structure 11, an inner wall structure 12, and a bridging member 13. Outer wall structure 11 and inner wall structure 12 are fixedly connected to each other by bridging member 13. A space or duct 14 is formed between opposed surfaces of the inner and outer wall structures, which surfaces face each other and delimit space or duct 14. Inner wall structure 12 comprises an extension extending upstream duct 14. A flange connection is provided at an upstream end of inner wall structure 12, or the extension, respectively, to connect inner wall structure 12 to bridging member 13. Bridging member 13 may be provided integrally, in one piece, with outer wall structure 11, or may be welded or otherwise suitably attached thereto. Bridging member 13 is sufficiently large-dimensioned to provide a high stiffness in the axial and radial directions, and to resist bending in the shown plane, and thus is suitable to support any forces acting on the inner and outer wall structures virtually without any deformation. Vane carrier unit 1 is arranged radially outside a rotor cover 7. Outer wall structure 11 is fixedly connected to an expansion turbine vane carrier 2, for instance by a flange connection. Blades 9 of a first row of running blades of an expansion turbine are arranged on a rotor 8. On an upstream end, space 14 is fluidly connected to a transition piece 4. A fuel discharge and/or mixing means 5 is arranged inside transition piece 4. A can combustor 3 joins into transition piece 4 at an upstream end thereof. Transition piece 4 and can combustor 3 are provided with a displaceable connection, such that can combustor 3 and transition piece 4 may displace with respect to each other along an axis of can combustor 3. Sealing means 6 are provided around a downstream end of can combustor 3 to provide a gas tight sealing between can combustor 3 and transition piece 4. It is for an instance known to apply so-called Hula seals for this purpose, which allow a displacement along a can combustor axis while at the same time providing a gas-tight sealing. In an exemplary embodiment, space 14 annularly extends around the circumference of the gas turbine engine. A multitude of can combustors 3 are arranged around the circumference of the gas turbine engine. A multitude of bridging members 13 are arranged around the circumference of the gas turbine engine. In particular, can combustors 3 and bridging members 13 are alternatingly arranged around the circumference of the gas turbine engine. Transition piece 4 provides a transition geometry from the exit of the can combustors to annularly extending space or duct 14. Still oxygen rich flue gas from can combustors 3 is annularly dispersed into annularly extending space 14 through transition piece 4. In certain states of operation, fuel may be discharged into the flue gas flow from can combustors 3, and be admixed with the flue gas through fuel discharge and/or mixing means 5 to form a flue gas/fuel mixture inside space 14. The mixture is subsequently combusted in space 14. In this respect, space 14 is provided as an annular combustor. Combustor liner segments may be provided on the surfaces of outer wall member 11 and inner wall structure 12 which face each other and delimit duct or space 14, in a manner the skilled person is familiar with. An explicit illustration of the liners is omitted for the sake of clarity of depiction, and as they are familiar to the skilled person. The liner segments may be rounded such as to provide a circular cross section, or may be plane plates or tiles, thus resulting in a polygonial cross section approximating a circular cross section. The liner segments may be equipped with a near wall cooling arrangement, and/or with integrated dampers in order to attenuate thermoacoustic oscillations in the annular combustor. An expansion turbine is provided adjacent a downstream end of vane carrier unit 1. An expansion turbine vane carrier 2 and running blades 9 of a first row of expansion turbine running blades are mentioned above and shown in the present illustration. The skilled person will readily appreciate that a main working fluid flow direction of the gas turbine engine extends along the axial direction e, and from can combustor 3 to the expansion turbine. A guide vane member 20 of a stationary first or inlet guide vane row of the expansion turbine is interposed between the annular combustor and the first row of running blades 9 of the expansion turbine, and is provided downstream of the annular combustor. Guide vane member 20 is supported a tan inner or hub side end at inner wall structure 12, and is supported a tan outer end at outer wall structure 11. A sealing member 24 is provided between the hub side end of guide vane member 20 and rotor cover 7. Sealing member 24 is arranged such as to allow axial and radial relative displacement between guide vane member 20 and rotor cover 7. Vane carrier unit 1 and guide vane member 20 jointly form a guide vane unit or guide vane assembly, in which, in the exemplarily shown embodiment, the guide vanes are provided in a common assembly with an annular combustor or duct 14. The duct 14 is provided with an annular downstream discharge face 30, the annular downstream discharge face 30 circumferentially extending around an axis of the turboengine and being in fluid communication with a circumferentially disposed row of guide vane members 20. The support assemblies through which guide vane member 20 is supported by the outer wall structure 11 and the inner wall structure 12, respectively, are denoted at A and B, and are lined out in more detail below.

FIGS. 1 and 2 show views from different circumferential positions of the gas turbine engine. In the depiction of FIG. 1, a can combustor 3 partly hides a bridging member 13. In the depiction of FIG. 2, a bridging member 13 partly hides a can combustor 3.

Figure 3:
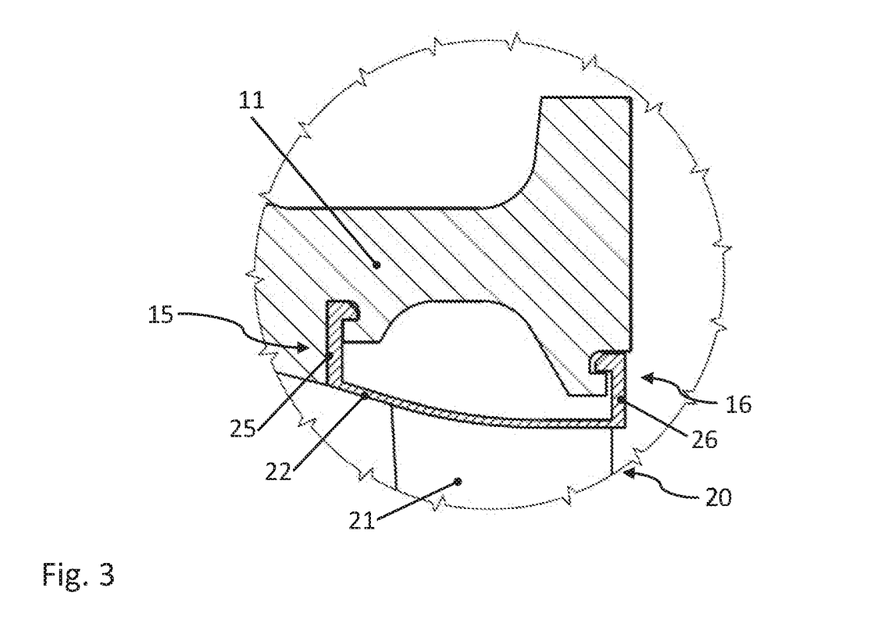
FIG. 3 the support arrangement of a guide vane member at an outer wall structure.
Figure 4:
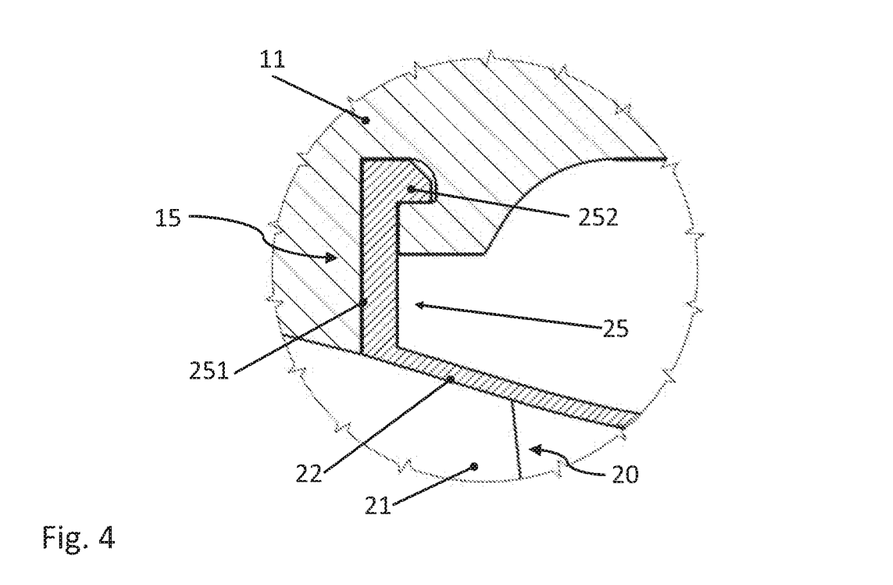
FIG. 4 a detail view of a radially and axially fixed support assembly.
Figure 5:
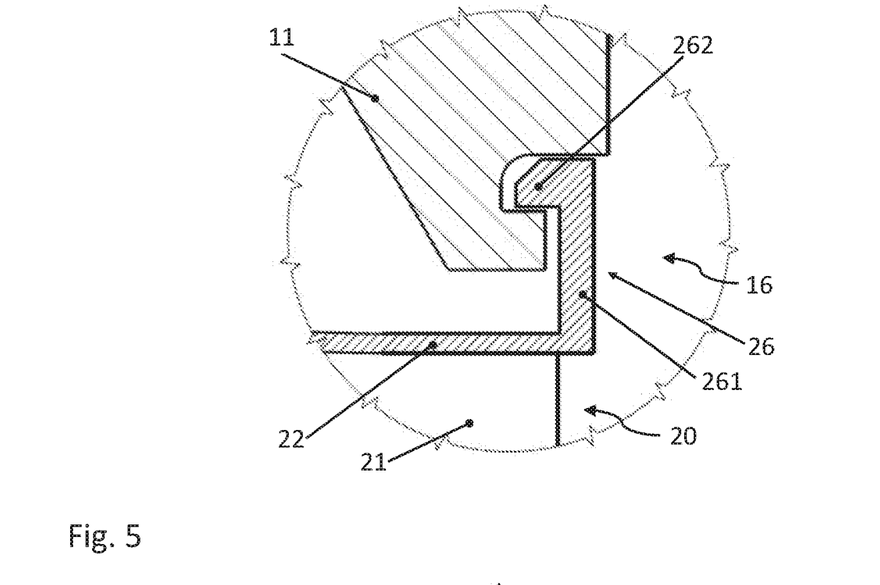
FIG. 5 a detail view of an auxiliary support assembly for facilitating inserting a guide vane member into a vane carrier unit.

FIG. 3 shows detail A of FIGS. 1 and 2, setting forth in more detail a support arrangement through which guide vane member 20 is supported by outer wall structure 11. Guide vane member 20 comprises one or more airfoils 21 and an outer platform 22, which constitutes a radially outer end of guide vane member 20. The support arrangement comprises a radially and axially fixed support assembly 15, provided at an upstream end of guide vane member 20, and an auxiliary support assembly 16, provided at a downstream end of guide vane member 20. Male support elements 25 and 26 extend radially outwardly from outer platform 22 and are received in female support features of outer wall structure 11. FIG. 4 shows more details of radially and axially fixed support assembly 15. Male support element 25 comprises a lug 251 which in turn comprises a locking protrusion 252. Lug 251 is received in a slot of the outer wall structure. The slot is provided with an undercut, which in turn receives locking protrusion 252. Lug 251 is received in the slot in a snug fit, that is, at least essentially without play, in the axial direction. Locking protrusion 252 is received in the undercut with a snug fit in the radial direction. Thus, a radially as well as axially fixed support assembly is provided. Male support element 25 may be inserted into the slot and the undercut in the circumferential direction of the gas turbine engine. In providing a radially as well as axially fixed support assembly at an upstream end of guide vane member 20, a transition between an inner surface of outer wall structure 11 and platform 22 is well-defined and may be provided without gaps, steps, or ledges, and may thus exhibit an outstanding aerodynamic performance. Auxiliary support assembly 16 is shown in more detail in FIG. 5. Male support element 26 comprises lug 261 and protrusion 262. Protrusion 262 engages an undercut of outer wall structure 11 with play in the radial as well as in the axial direction. Moreover, also lug 261 is provided distant from a counter surface of outer wall structure 11. Male support element 26 may thus displace with respect to outer wall structure 11 in the radial as well as in the axial direction, and has no support function in an assembled guide vane unit. However, when guide vane member 20 is inserted into vane carrier unit 1, auxiliary support assembly 16 may serve to temporarily support guide vane member 20 during the assembly process. Assembly of the guide vane unit is thus largely facilitated.

Figure 6:
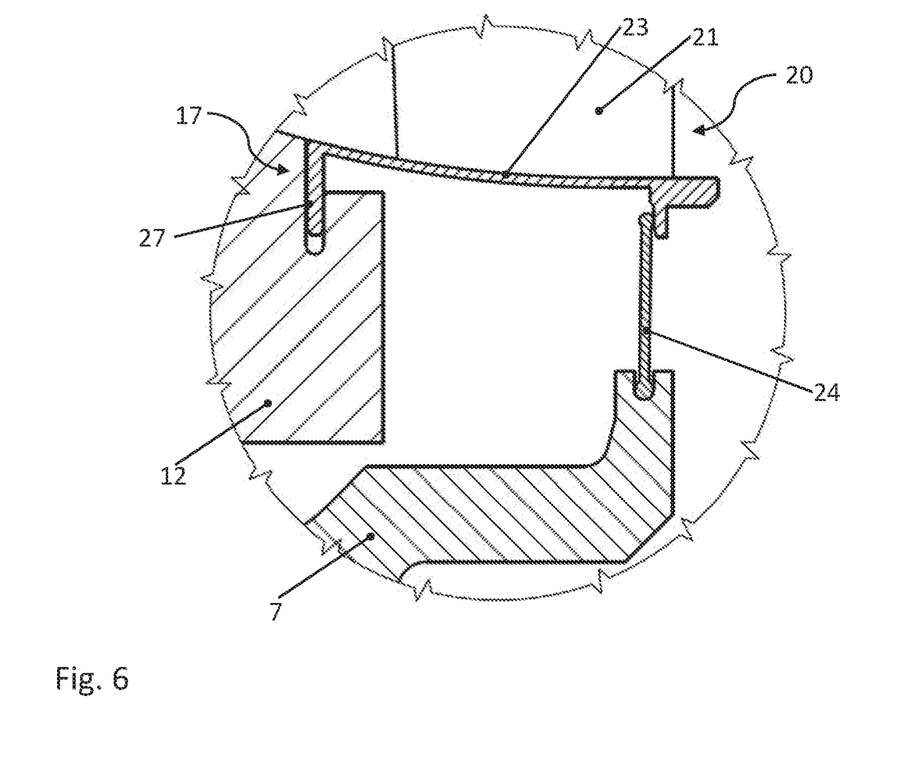
FIG. 6 the support arrangement of a guide vane member at an inner wall structure.

FIG. 6 shows detail B of FIGS. 1 and 2. Guide vane member 20 comprises, as noted above, at least one airfoil 21, and further radially inner or hub side platform 23, constituting a radially inner or hub side end of guide vane member 20. Guide vane member 20 is supported at an upstream and radially inner end thereof at inner wall structure 12 by a radially floating and axially fixed support assembly 17. Radially floating and axially fixed support assembly 17 is provided by a lug 27, which is provided as a male support element and extending radially inwardly from inner platform 23, and which is received in a female support feature of inner wall structure. Male support element 27 is received in the female support feature of inner wall structure 12 with a snug fit in the axial direction, while being free to displace and float in the radial direction. At a downstream end of guide vane member 20, sealing member 24 is provided for sealing between guide vane member 20 and rotor cover 7. Sealing member 24 is pivotably received by rotor cover 7 and abuts a suitably provided structure of guide vane member 20. Generally, for instance cooling air may be provided in a space between inner wall structure 12 and rotor cover 7. The pressure of said cooling air generally is higher than the working fluid pressure downstream the first guide vane row, and thus presses sealing member 24 to the sealing structure of guide vane member 20. Moreover, sealing member 24 may be provided as an elastic member. The sealing arrangement provided by sealing member 24 between the rotor cover 7 and guide vane member 20 allows for a relative axial and radial displacement between the rotor cover 7 and guide vane member 20.

By virtue of the support arrangement lined out above, guide vane member 20 is axially fixed at its upstream end to the vane carrier. A downstream end of guide vane member 20 is enabled to freely float in order to compensate differential thermal expansion. Guide vane member 20 is radially fixedly supported at the vane carrier unit at one radial end, while it is radially floatingly supported by the vane carrier unit at the other radial end. Differential thermal expansion in the radial direction is thus accounted for.

Figure 7:
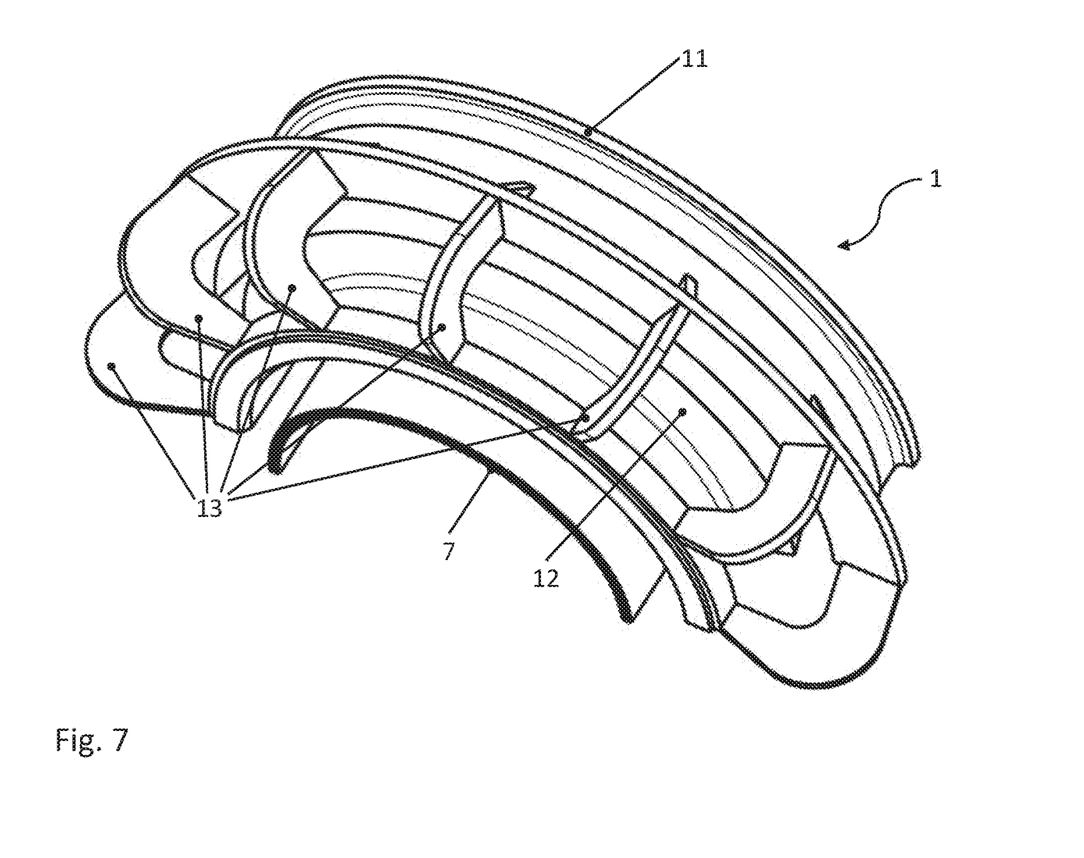
FIG. 7 a perspective view of a vane carrier unit of the type initially mentioned.
Figure 8:
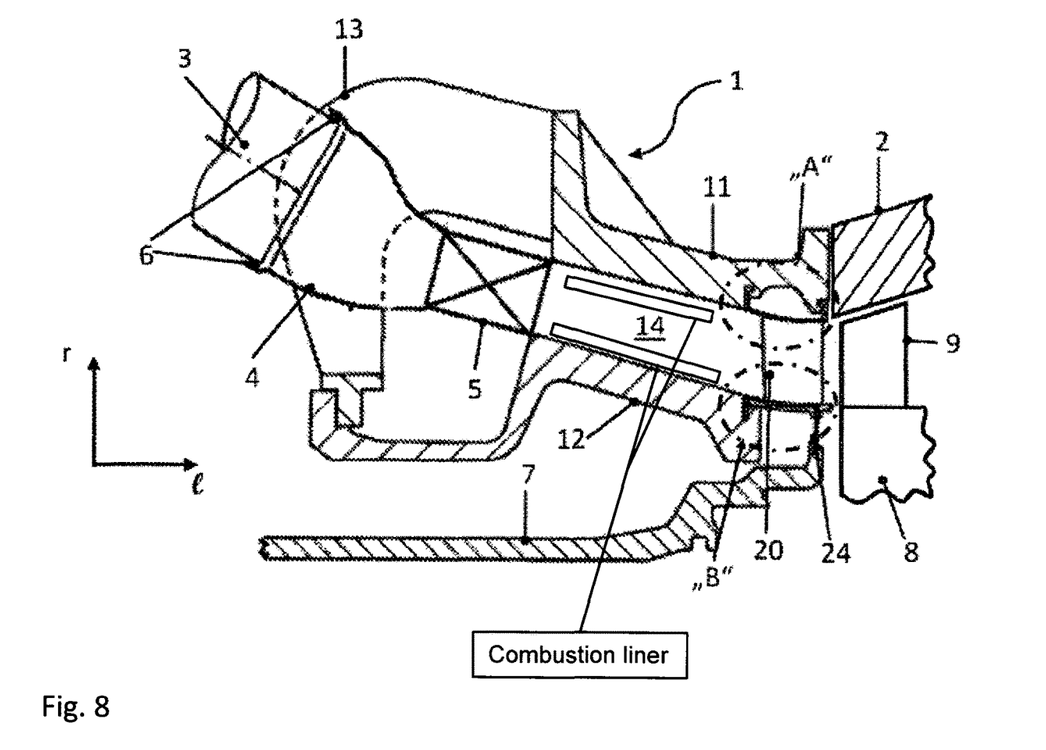
FIG. 8 a view of a combustor liner segment.

FIG. 7 shows a perspective view of a vane carrier unit 1 and rotor cover 7. The vane carrier unit 1 is provided as a generally semi-annular element. In arranging two of these vane carrier units circumferentially abutting each other, an annular arrangement is provided. An annular row of guide vanes is accordingly formed. A multitude of bridging members 13 are circumferentially distributed along the circumferential extent of vane carrier unit 1, and fixedly connect outer wall structure 11 and inner wall structure 12 in order to jointly form vane carrier unit 1.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

LIST OF REFERENCE NUMERALS 1 vane carrier unit
2 expansion turbine vane carrier
3 can combustor
4 transition piece
5 fuel discharge and/or mixing means
6 sealing means
7 rotor cover
8 rotor
9 blade of first row of expansion turbine running blades
11 outer wall structure
12 inner wall structure
13 bridging member
14 space, duct
15 support assembly
16 auxiliary support assembly
17 support assembly
20 guide vane member
21 airfoil
22 outer platform
23 inner platform, hub side platform
24 sealing member
25 male support element
26 male support element
27 male support element, lug
251 lug
252 locking protrusion
261 lug
262 protrusion
l axial direction
r radial direction

The invention claimed is:

1. A turboengine, the turboengine defining a radial direction (r), an axial direction (l), a circumferential direction, and a main working fluid flow direction extending in the axial direction, the turboengine, comprising:
a combustor;
a transition piece arranged downstream of the combustor with respect to the main working fluid flow direction;
a mixer arranged at a downstream end of the transition piece;
an outer wall structure;
an inner wall structure, wherein the inner wall structure is provided at a radially inner position with respect to the outer wall structure, and each of the outer wall structure and the inner wall structure has a surface, each of said surfaces being arranged facing each other in the radial direction;
a duct provided between the inner wall structure and the outer wall structure and having an upstream end connected to the mixer and a downstream end with respect to the main working fluid flow direction; and
at least one guide vane member arranged at the downstream end of the duct, the at least one guide vane member having at least one airfoil, a radially inner end and a radially outer end, the radially inner end of the guide vane member being supported at the inner wall structure and the radially outer end of the guide vane member being supported at the outer wall structure; wherein
the inner wall structure and the outer wall structure being jointly provided as a vane carrier unit, wherein the inner wall structure and the outer wall structure are fixedly connected to each other by at least one bridging member extending between the inner wall structure and the outer wall structure, and wherein the at least one bridging member is provided upstream the downstream end of the duct with respect to the main working fluid flow direction, wherein the facing surfaces of the inner wall structure and of the outer wall structure delimit the duct and the guide vane member is attached to one of the outer and inner wall structures by an axially and radially fixed support arrangement and is attached to the other one of the inner and outer wall structures by a support arrangement which provides a fixed support in the axial direction and provides a floating support in the radial direction.

2. The turboengine according to claim 1, comprising:
at least two vane carrier units along the circumferential direction of the turboengine to form an annular guide vane row.

3. The turboengine according to claim 1, wherein the at least one bridging member is provided upstream of the duct which is formed between the outer wall structure and the inner wall structure.

4. The turboengine according to claim 1, comprising:
a multitude of bridging members along the circumferential direction, wherein at least two bridging members are provided at a circumferential distance from each other.

5. The turboengine according to claim 1, wherein the at least one bridging member is one of curved or angled and cantilevers from the outer wall structure in a first section in the upstream direction and extends in a second section radially inwardly to the inner wall structure.

6. The turboengine according to claim 1, wherein the inner wall comprises:
an extension extending upstream of the duct.

7. The turboengine according to claim 1, wherein the inner wall structure and the at least one bridging member are attached to each other by a flange connection.

8. The turboengine according to claim 1, wherein the at least one guide vane member is an inlet guide vane member of an expansion turbine and is provided upstream a first row of running blades of the expansion turbine; and wherein the outer wall structure extends from an expansion turbine vane carrier, the duct being in fluid communication with the expansion turbine with the inlet guide vane member being interposed between the duct and the first row of running blades of the expansion turbine.

9. The turboengine according to claim 1, wherein the duct is provided with an annular downstream discharge face, the annular downstream discharge face circumferentially extending around an axis of the turboengine and being in fluid communication with a circumferentially disposed row of guide vane members.

10. The turboengine according to claim 1, comprising:
a multitude of can combustors circumferentially disposed around an axis of the turboengine and upstream of the duct, wherein each can combustor is in fluid communication with the duct at an upstream end thereof.

11. The turboengine according to claim 1, wherein the duct is provided as a combustor, wherein combustor liners are provided on mutually facing arranged surfaces of the outer wall structure and the inner wall structure.

12. The turboengine according to claim 1, wherein the axially and radially fixed support arrangement comprises a radially extending support element extending from a platform of the guide vane member and an axially extending locking protrusion extending from the radially extending support element.

13. The turboengine according to claim 12, wherein the axially fixed and radially floating support arrangement comprises a radially extending support element extending from a second platform of the guide vane member and a seal arranged on a downstream end of the second platform.

* * * * *